(No Model.) 6 Sheets—Sheet 3.
F. SCHOETTLE, Dec'd.
M. A. & W. C. SCHOETTLE, Executors.
MACHINE FOR MAKING PAPER TUBES.
No. 604,090. Patented May 17, 1898.
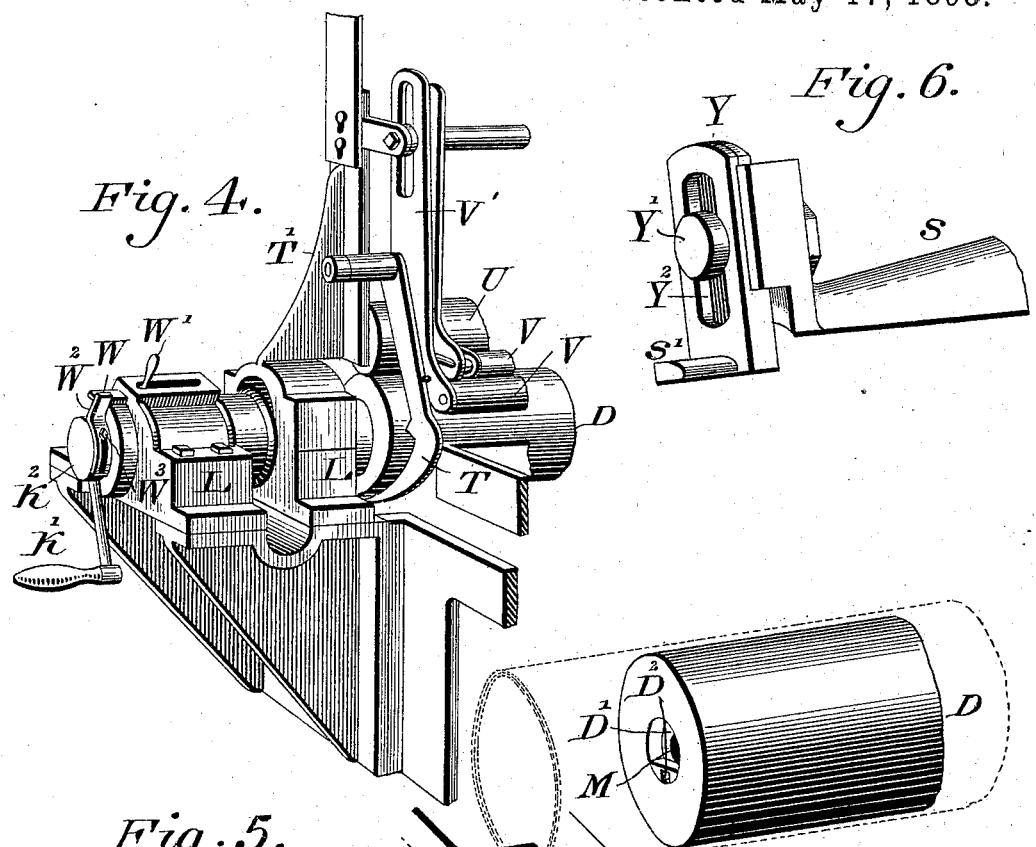
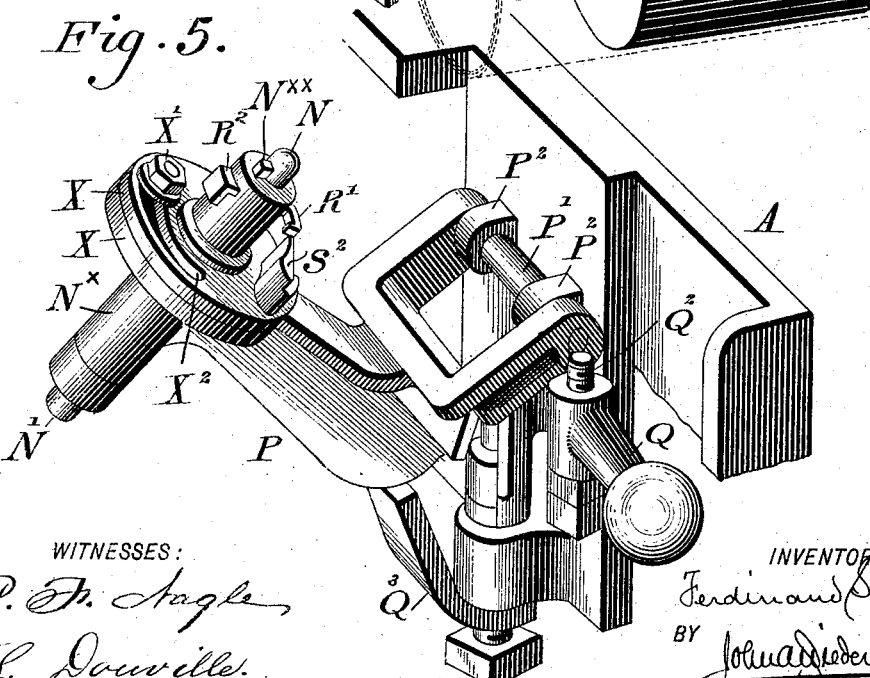
WITNESSES:
P. F. Nagle
L. Douville
INVENTOR
Ferdinand Schoettle
BY
John A. Wiedersheim
ATTORNEY.

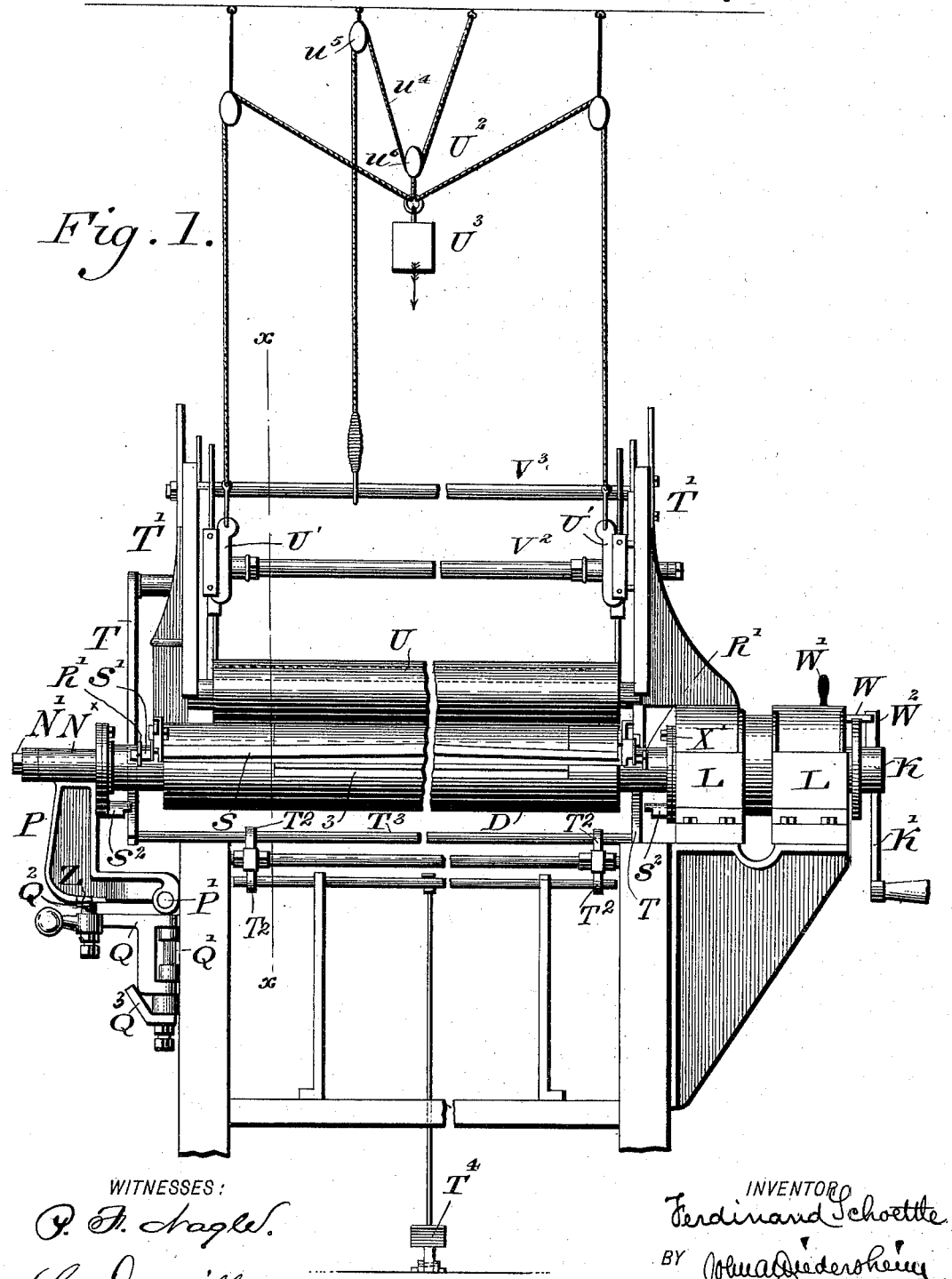

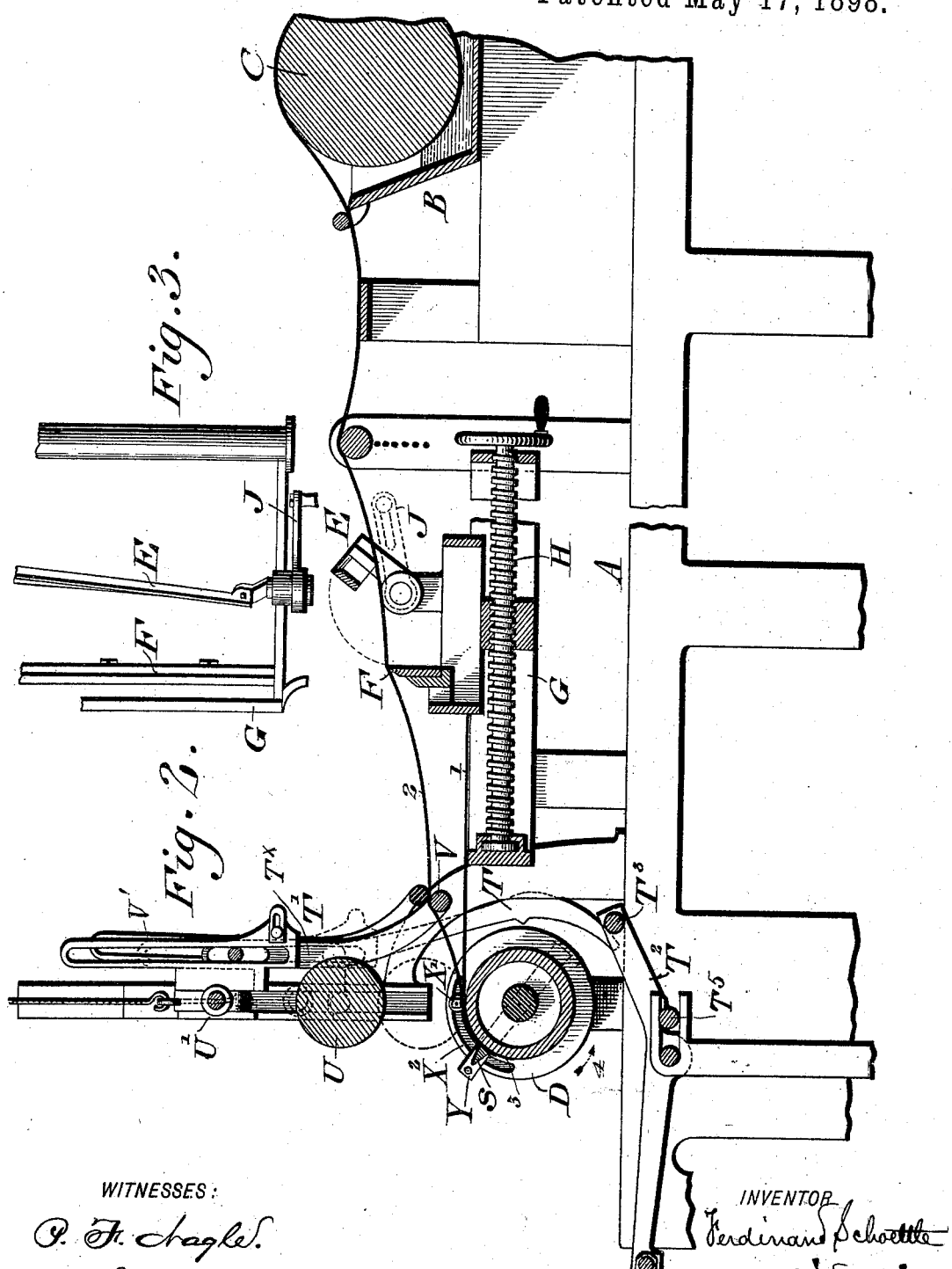

(No Model.) 6 Sheets—Sheet 4.
F. SCHOETTLE, Dec'd.
M. A. & W. C. SCHOETTLE, Executors.
MACHINE FOR MAKING PAPER TUBES.
No. 604,090. Patented May 17, 1898.
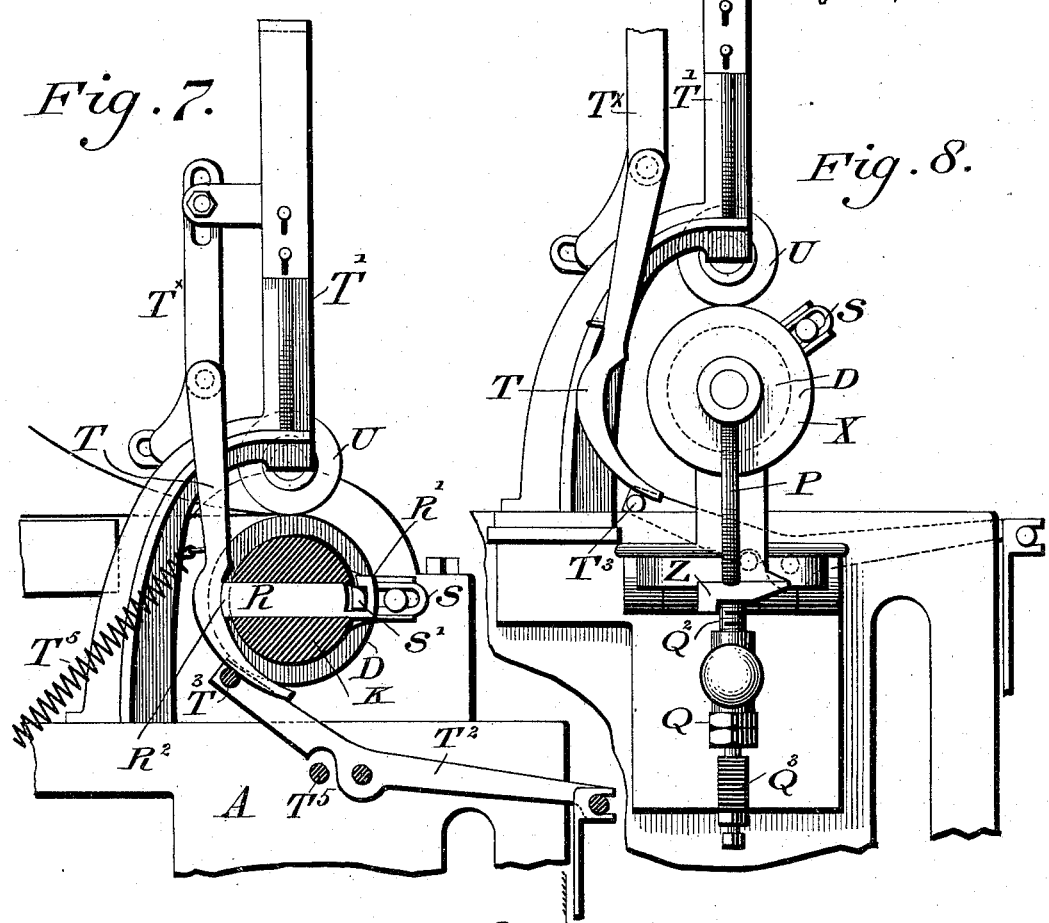
WITNESSES:
P. F. Nagle
L. Douville
INVENTOR
Ferdinand Schoettle
BY John Liedersheim
ATTORNEY.

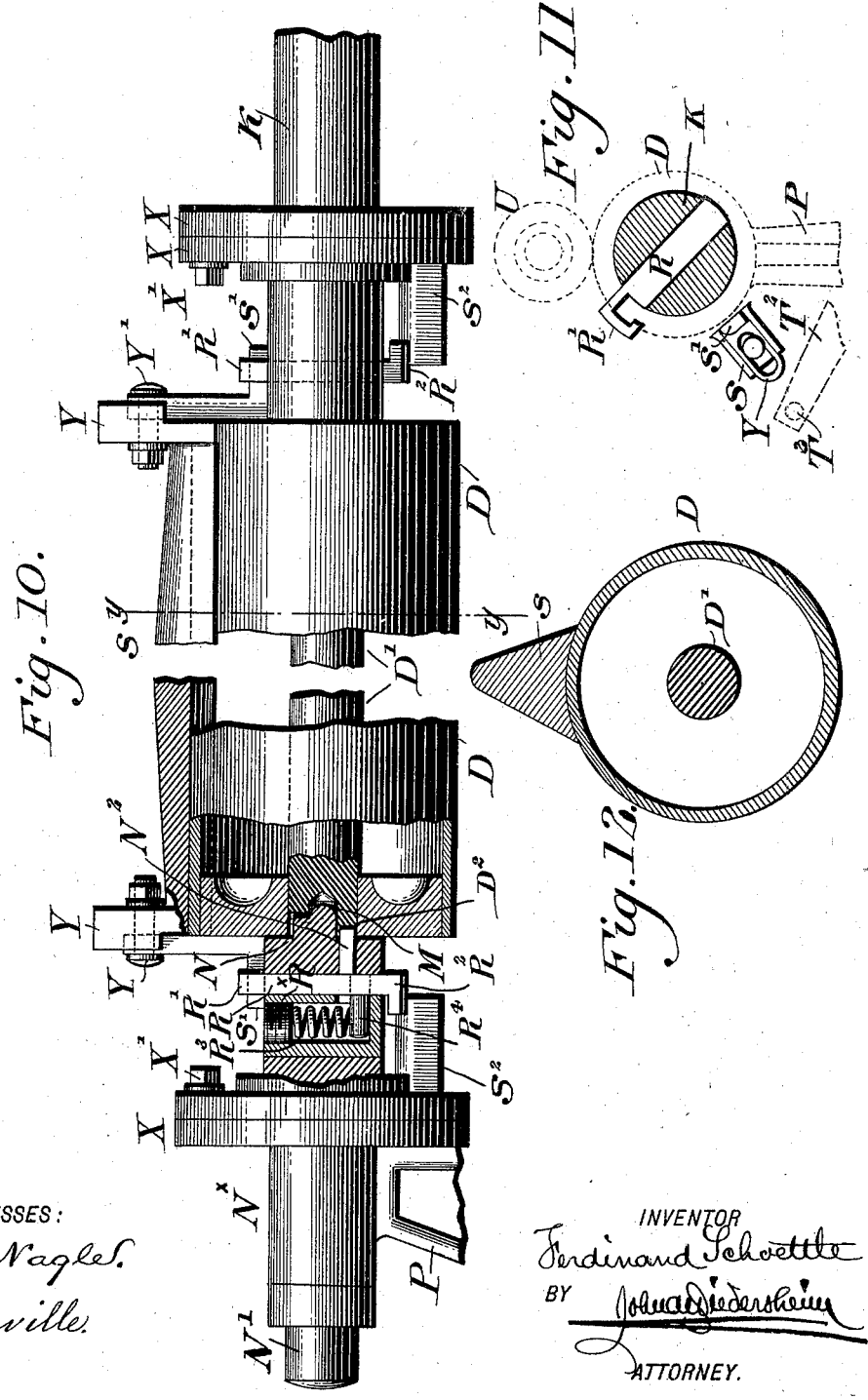

(No Model.) 6 Sheets—Sheet 6.

F. SCHOETTLE, Dec'd.
M. A. & W. C. SCHOETTLE, Executors.
MACHINE FOR MAKING PAPER TUBES.

No. 604,090. Patented May 17, 1898.

WITNESSES:
P. F. Nagle.
L. Douville.

INVENTOR
Ferdinand Schoettle, Deceased
BY Mary A. Schoettle, Executrix
Wm. C. Schoettle, Executor
John A. Wiederheim
ATTORNEY.

UNITED STATES PATENT OFFICE.

FERDINAND SCHOETTLE, OF PHILADELPHIA, PENNSYLVANIA; MARY A. SCHOETTLE AND WILLIAM C. SCHOETTLE EXECUTORS OF SAID FERDINAND SCHOETTLE, DECEASED.

MACHINE FOR MAKING PAPER TUBES.

SPECIFICATION forming part of Letters Patent No. 604,090, dated May 17, 1898.

Application filed June 9, 1892. Serial No. 436,053. (No model.)

*To all whom it may concern:*

Be it known that I, FERDINAND SCHOETTLE, a citizen of the United States, residing in the city and county of Philadelphia, State of Pennsylvania, have invented a new and useful Improvement in Machines for Making Paper Tubes, which improvement is fully set forth in the following specification and accompanying drawings.

My invention relates to improvements in machines for making paper tubes; and it consists, first, in a mandrel having a holder with novel means for retaining the same thereon.

It further consists of the combination and arrangement of parts hereinafter described and claimed.

Figure 13:
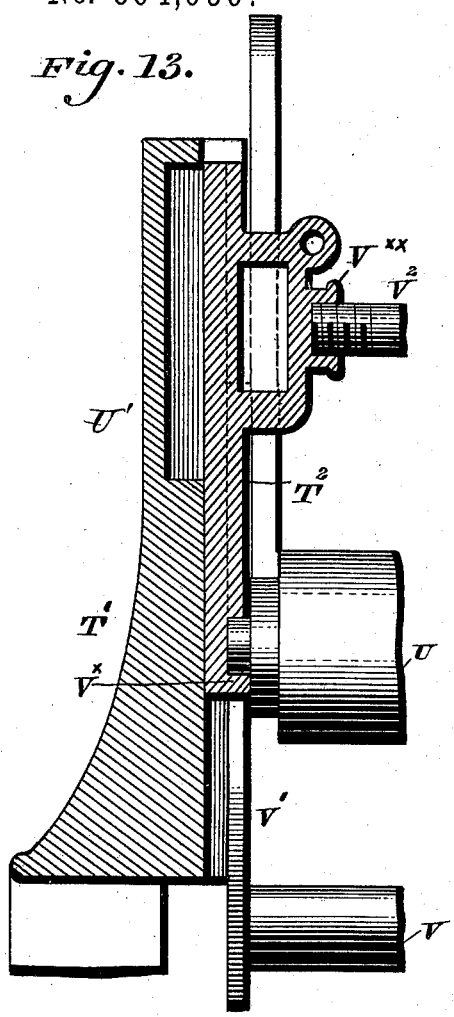
Figure 14:
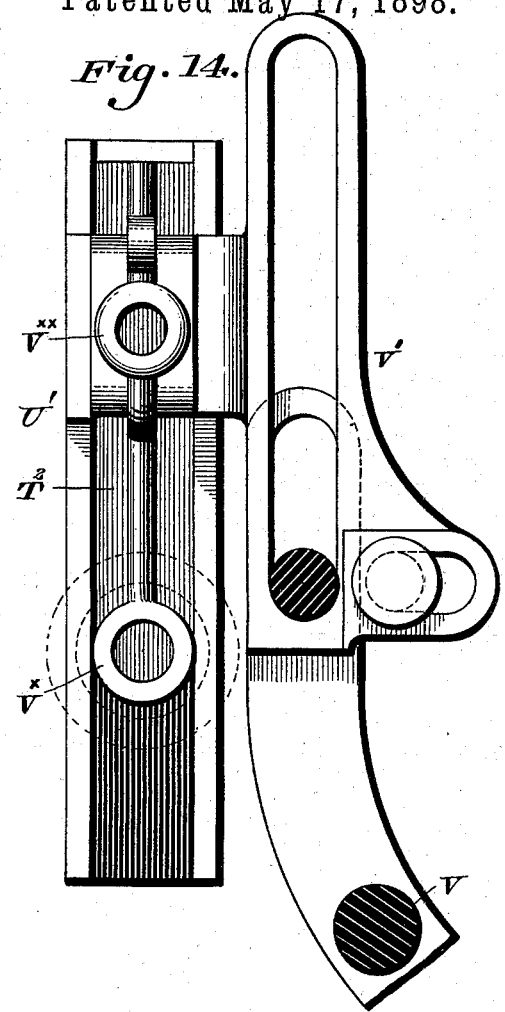
Figure 15:
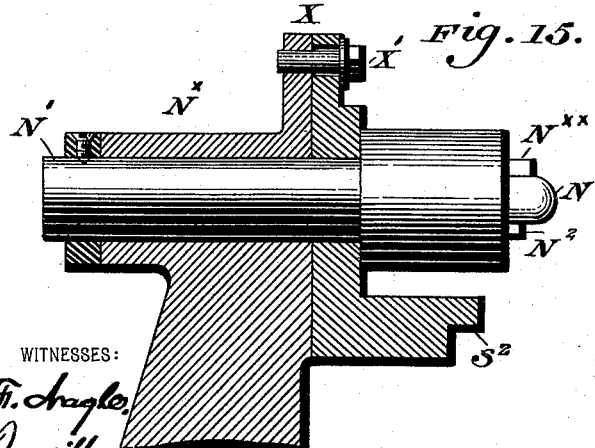

Figure 1 represents a front view of a machine for making tubes embodying my invention. Fig. 2 represents a longitudinal vertical section thereof on an enlarged scale. Fig. 3 represents a top view of part of the web-cutting device. Fig. 4 represents a perspective view of one end of the machine. Fig. 5 represents a perspective view of the opposite end thereof, the journals being out of engagement with the mandrel. Fig. 6 represents a perspective view of a portion of the holding-bar. Fig. 7 represents a vertical section of a portion of the machine on line $xx$, Fig. 1. Fig. 8 represents an end view thereof. Figs. 9 and 10 represent partial side elevations and partial longitudinal sections of the drum or roller on enlarged scales. Fig. 11 represents a section of a detached portion. Fig. 12 represents a section on line $y\,y$, Fig. 10. Fig. 13 represents a vertical section, on an enlarged scale, showing portions of pressure and guide rollers of the machine and the vertically-sliding bearings therefor. Fig. 14 represents a partial side elevation and partial section at a right angle to Fig. 13. Fig. 15 represents a sectional view, on an enlarged scale, of the left end portions of Figs. 9 and 10.

Similar letters and numerals of reference indicate corresponding parts in the several figures.

Referring to the drawings, A designates the frame of the machine, on the rear end of which is mounted the gum or paste cup B, into which dips the roller C, around which latter passes the sheet or web of paper which is to be formed into tubes, said paper being suitably guided from said roller C to the mandrel D of the tube-forming mechanism.

Intermediate of the roller C and mandrel D are the oscillating cutter E and bed-knife F, both mounted on the carriage G, which, by means of a screw H, fitted to said carriage and swiveled on the frame A, is adapted to move the knife nearer to or farther from the mandrel D, so as to cause the proper length of paper to be cut off.

The axis of the knife E is provided with a suitable crank-handle J for conveniently operating the same. The mandrel D is mounted at one end on the journal K, whose bearings L are on the frame A, said journal having a suitable crank-handle K' for rotating the mandrel.

The core D' of the mandrel has at the end opposite to the journal K a socket M to receive the stud N on a journal N', which supports the end of said mandrel opposite to the journal K, said stud carrying a lug $N^2$, which is adapted to enter a recess $D^2$ in the wall of the socket M, said stud being also provided, as shown in Fig. 15, with the shoulder $N^{\times\times}$, which enters a recess in the core of the mandrel D, said shoulder, with the lug $N^2$, thus locking the mandrel with the journal N', whereby the rotary motion of the former may be communicated to the latter. (See Figs. 5, 9, and 10.)

P designates a radial arm which carries the bearing $N^\times$ for the journal N', the same being mounted on the shaft P', which is supported on ears $P^2$ on the side of the frame A, whereby said journal N' may be moved to and from the end of the mandrel D. Below the shaft P' is a lever Q, which is mounted on a vertical shaft Q' on the frame A and carries a vertically-adjustable post or screw $Q^2$, which when the journal is in operative position is in contact with the under side of the arm P, thus supporting the latter and retaining said journal in engagement with the mandrel D, as will be seen in Fig. 1. When the lever Q is withdrawn from said arm, the latter is permitted to drop, thus disengaging the journal from the mandrel, whereby the end of the roller is free to permit the tube thereon to be removed, this position of parts being shown in Fig. 5.

Secured to the frame A below the lever Q is a foot $Q^3$, which projects therefrom in such manner that the arm P abuts thereagainst when the same is lowered, thus supporting said arm and connected parts and limiting the descent thereof.

In the journals K and N' are sliding bars R, which pass diametrically through the journals and have each at one end the hook R' and at the opposite end the shoe $R^2$. A spring $R^3$ is located within each journal, the same bearing against a pin or projection $R^4$ on the bar R for forcing the hooked end of the latter toward the periphery of the journal.

S designates a bar for pressing or holding the paper on the mandrel D, the face of said bar being concave (see Fig. 12) and having at its ends the laterally-projecting lugs S', which are adapted to be engaged by the hooks R', and thereby pressed against the journals K and N', thus firmly holding the paper on the mandrel D. Projecting inwardly from the inner ends of the bearings of the journals K and N' are cams $S^2$, which are so disposed that when the journals rotate the shoes $R^2$ ride thereon, whereby the bars R are moved and the hooks R' withdrawn from the lugs S', thus releasing the holder S, as will be hereinafter fully explained.

Referring to Figs. 5 and 7, it will be seen that the hooks are recessed on their inner faces, so as to seat the lugs S' therein, and thus prevent accidental disengagement of the latter.

In order to move the bars R so that the hooks R' permit the lugs S' to be placed between the same and the mandrel by hand, I employ the swinging arms T, which are mounted upon and depend from the bars $T^\times$, adjustably secured to slotted arms or projecting portions of the standards T', and have their lower ends adapted to engage with the shoes $R^2$ of the bars R. Adjustably secured by bolts and nuts to the slotted guide V' are the bars $T^\times$, which have at their lower ends the upper ends of the arms T pivotally connected therewith. A system of levers consisting of the angular side bars $T^2$ is mounted on the frame A below the mandrel D and having at top a cross-bar $T^3$, which is adapted to engage with the lower ends of the arms T and by the action of a treadle $T^4$ to force said arms against the bars R, whereby the hooks R' of the latter are moved from the periphery of the mandrel, so that the lugs S' may be placed thereunder by hand. When the treadle $T^4$, which is connected with the lower and outer ends of said side bars $T^2$, is let go, the arms T are drawn from the mandrel D by the action of springs $T^5$, suitably connected with said arms and proper portions of the frame. A cross-bar $T^5$, secured at its ends to the frame A, serves as a stop to limit the downward movement of one end of said side bars $T^2$.

U designates a pressure-roller which is located above the mandrel D and adapted to be raised therefrom and lowered thereupon, its shaft being mounted upon boxes U', which are guided in grooves in the standards T' on the frame A and connected by a suitable rope or chain $U^2$ with a weight $U^3$, whereby the ascent of said roller U may be assisted. The weight $U^3$, which bears upon the chain $U^2$ so as to normally raise the roller U, is raised or lowered, as required, by means of the rope $u^4$ and the fast and loose pulleys $u^5$ $u^6$, respectively. The lower end of the said rope $U^4$ is provided with a hook for securing it to the cross-bar $V^2$ when the weight is raised and the roller is lowered and to the cross-bar $V^3$ when the weight is lowered and the roller raised, said bars $V^2$ and $V^3$ being supported in the standards T' or attachments thereof.

At the rear of and below the roller U are guide-rollers V, which are suitably journaled in the slotted arms V', which are adjustably secured to brackets on the standards by means of bolts and nuts, so as to be raised and lowered, they serving, when on the mandrel D, to prevent buckling or wrinkling of the paper when it is upon the said mandrel D.

In Figs. 13 and 14 the bearings $V^\times$ and $V^{\times\times}$ of the roller U and cross-bar $V^2$ are mounted on the slide U', which is guided in the standard T', whereby said roller and bar may rise and fall relatively to the mandrel D. Fig. 14 shows also the guide V' for the arm, which carries one of the rollers V. The location of the rollers V and their arms in relation to the mandrel D are more particularly shown in Fig. 2, it being noticed in all of the figures that said mandrel is of greater diameter than their journals.

In the bearing of the journal K is a slide W, which is provided with a handle W', so that said slide may be projected outwardly and engaged with a stop-piece $W^2$, which projects from the hub portion $K^2$ of the crank-handle K', as will be seen in Figs. 1 and 4, said piece $W^2$ being adjustably connected with the portion $K^2$ by means of a bolt $W^3$, which passes through a slot in said piece and screws into said portion. The bearings of the journals K N' are each divided, the ends of the divisions having collars X secured to them, the same being placed together and adjustably connected by means of a screw X', which passes through a slot $X^2$ in one of the collars and enters the contiguous collar, by which provision the cams $S^2$, connected with the journals, may be nicely adjusted relatively to each other and to the mandrel D.

The ends of the holder S are each formed in divisions Y, which are connected by means of a bolt Y', which passes through a slot $Y^2$ in one of the divisions and screws into the other division, thus adapting said holder to be adjusted relatively to the mandrel D and the hooks R'.

The advance motion of the lever Q is limited by a shoulder Z on the lower end of the arm P, the screw or post Q² abutting against said shoulder, as will be seen in Fig. 8.

The operation is as follows, the parts being in the position shown in Fig. 1: A lining 1, which is of fabric or other suitable material and of proper size for the desired tube, is placed on the top of the carriage G, so that one end rests on the mandrel D, and the pasted or gummed web 2 of paper from which the roll is to be made is drawn by hand from the roller C and its forward end laid upon part of said lining, as shown in Fig. 2, leaving, however, a lap or uncovered end 3 of said lining, as seen in Fig. 2. The roller U is now lowered, whereby it presses upon the lining and web on the top of the mandrel, after which the slide W is thrown out, so that the stop-piece W² of the handle K' abuts against the same. The treadle T⁴ is now depressed, whereby the arms T are forced against the bars R and the latter moved so as to uncover the hooks thereof, whereby the bar or lugs of the binder S may be engaged with said hooks. The treadle is then let go, whereby the hooks close on the binder and the latter is firmly held upon the end portions of the lining and web on the mandrel, the roller then being raised by being thrown up by hand. Now throw back the slide and turn the crank, whereby the rotation of the mandrel carries the pieces 1 and 2 around with it, forming a partial tube until the shoes R² strike the cams S², when the bars R are moved, so as to force out the hooks R' thereof and release the binder S, which latter then drops upon the table at the front part of the frame beneath the mandrel, where it is accessible for the next application. It will be seen that the mandrel revolving in the direction of the arrow 4, Fig. 2, will carry the bar S nearly to the roller U before the shoe R² reaches the cam S², the bar, however, dropping off before it comes in contact with the said roller, the latter pressing the severed end of the paper firmly upon the tube. The roller U is then lowered and a few turns may be given to the mandrel, so as to properly press together the web 2 and lining 1 of the roll or tube, which latter then requires to be removed, for which purpose the slide W is thrown out and the stop W² of the crank-handle moved thereagainst, so that the mandrel is in proper position. The roller U is then raised and the lever Q thrown back, whereby the arm P is lowered and the stud N and lug N² withdrawn from the socket M, thus entirely uncovering the adjacent end of the mandrel, so that the manufactured tube may be slipped off the same. (See Fig. 5.) Now again raise the arm P, whereby the stud N and lug N² reënter the socket M and recess D² and then lock the arm P by the screw or stud Q² on the lever Q, after which throw back the slide W and rotate the crank-handle backward until the shoe R² strikes the cam S², when another lining-piece may be adjusted upon the mandrel and the pasted web drawn forward and located on said lining, as in the previous case, and the other operations are repeated, whereby another tube is produced.

The size of the web to be severed in order to produce a tube of given thickness may be adjusted by the operation of the screw H, thus moving the cutter nearer to or farther from the mandrel.

Owing to the lap 3 of the lining 1 the pasted or gummed face of the web is prevented from coming in contact with the mandrel D, the effect of which is evident.

The tension of the springs R³ of the bars R is adjusted by means of nuts R×, which are screwed to the walls of the openings in which said springs are located and bear against said springs. (See Figs. 9 and 10.)

Having thus described my invention, what I claim as new, and desire to secure by Letters Patent, is—

1. In a machine for making paper tubes, a frame, a mandrel mounted in standards on said frame and having a detachable journal, a pasting-trough on said frame, and an adjustable carriage having mounted thereon a cutter intermediate of said mandrel and trough, and an automatically-detachable holder on said mandrel.

2. A mandrel having journals with sliding bars therein, a hook on one end of each of said bars, a spring bearing against a pin on each of said bars, and a holding-bar with ends adapted to be engaged by said hooks, said parts being combined substantially as described.

3. A mandrel having journals with sliding bars therein, hooks on the one end of said bars, and shoes on the other end thereof, springs bearing against pins on said bars, a holding-bar with ends engaged by said hooks, and bearings for said journals having cams thereon engaged by the said shoes, said parts being combined substantially as described.

4. In a machine for making paper tubes, a mandrel with journals having spring-controlled bars therein, with hooks on one of their ends adapted to engage the ends of a holding-bar, and swinging arms adapted to engage the other ends of said bars so as to operate them against said springs, said parts being combined substantially as described.

5. In a machine for making paper tubes, a mandrel, a detachable journal therefor, a bearing for said journal having a swinging support, and means for holding said support in place when the journal is secured to the mandrel, said parts being combined substantially as described.

6. A mandrel, a detachable journal therefor, a swinging bearing for said journal, a lever-arm for supporting said bearing when the journal is connected with the mandrel, and an arm for supporting said bearing when the journal is detached therefrom, said parts being combined substantially as described.

7. A mandrel having the bearing of one of its journals provided with a slide, and a crank-handle for said journal having a stop for said slide, the opposite journal being detachably connected with the mandrel and provided with a lug which is adapted to enter a recess in said mandrel, substantially as described.

8. A journal for the mandrel having a crank-handle therefor with a stop thereon, a slide on the bearing of said journal adapted to engage said stop, a stud with a lug thereof on the opposite journal, the latter being detachable from the mandrel, the mandrel having a socket with a recess to receive said stud and lug, and a supporting-arm for the detachable journal, said parts being combined substantially as described.

9. A mandrel, a binder removably connected therewith, a detachable journal for said mandrel adapted to interlock therewith, and a device on the other journal whereby the interlocking means for the detachable journal may register, said parts being combined substantially as described.

FERDINAND SCHOETTLE.

Witnesses:
JOHN A. WIEDERSHEIM,
R. H. GRAESER.